(12) United States Patent
Costa et al.

(10) Patent No.: US 12,385,755 B2
(45) Date of Patent: Aug. 12, 2025

(54) METHOD FOR PREPARING ROAD GUIDANCE INSTRUCTIONS

(71) Applicants: RENAULT S.A.S, Boulogne-Billancourt (FR); NISSAN MOTOR CO., LTD., Yokohama (JP)

(72) Inventors: Frederic Costa, Gif sur Yvette (FR); Lea Patteyn, La Brede (FR)

(73) Assignees: AMPERE S.A.S., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 195 days.

(21) Appl. No.: 17/760,267

(22) PCT Filed: Jan. 19, 2021

(86) PCT No.: PCT/EP2021/051068
§ 371 (c)(1),
(2) Date: Aug. 5, 2022

(87) PCT Pub. No.: WO2021/156050
PCT Pub. Date: Aug. 12, 2021

(65) Prior Publication Data
US 2023/0072552 A1    Mar. 9, 2023

(30) Foreign Application Priority Data
Feb. 5, 2020    (FR) ..................... 20 01123

(51) Int. Cl.
*G01C 21/36*    (2006.01)

(52) U.S. Cl.
CPC ..... *G01C 21/3629* (2013.01); *G01C 21/3602* (2013.01); *G01C 21/3647* (2013.01); *G01C 21/3691* (2013.01)

(58) Field of Classification Search
CPC ............ G01C 21/3629; G01C 21/3602; G01C 21/3647; G01C 21/3691; G01C 21/34; G01C 21/3804; G01C 21/387
See application file for complete search history.

(56) References Cited

U.S. PATENT DOCUMENTS 6,212,470 B1    4/2001    Seymour et al.
2005/0256635 A1*   11/2005   Gardner ............ G01C 21/3641
                                                  340/995.23
(Continued)

FOREIGN PATENT DOCUMENTS

EP    0 577 782 A1    1/1994
EP    1 947 421 A1    7/2008
(Continued)

OTHER PUBLICATIONS

International Search Report issued Apr. 16, 2021 in PCT/EP2021/051068, filed on Jan. 19, 2021, 3 pages.
(Continued)

*Primary Examiner* — Anne Marie Antonucci
*Assistant Examiner* — Jewel Ashley Kuntz
(74) *Attorney, Agent, or Firm* — Oblon, McClelland, Maier & Neustadt, L.L.P.

(57) ABSTRACT

A method prepares voice guidance instructions for an individual, formulated in the most natural fashion possible. The method includes:—determining, by a computer, a path to be followed, —acquiring, by an image acquisition unit, at least one image of the environment of the individual, —processing the image in order to detect at least one object therein and in order to characterise the object, and —preparing a voice guidance instruction supplying the user with a piece of information for carrying out a manoeuvre in order to follow the path. The method also includes determining a level of complexity of the manoeuvre, and, in the preparation step, the voice guidance instruction is formulated using an indi- (Continued)

cation deduced from the characterisation of the object only if the level of complexity of the manoeuvre is greater than a first threshold.

15 Claims, 1 Drawing Sheet

(56) References Cited

U.S. PATENT DOCUMENTS

2010/0250126 A1    9/2010  Epshtein et al.
2011/0187515 A1*   8/2011  Saito ................ B60W 30/0956
                                                             701/1
2012/0016586 A1    1/2012  Epshtein et al.
2013/0096822 A1    4/2013  Sempuku et al.
2013/0311081 A1*  11/2013  Yamakawa ........ G01C 21/3626
                                                           701/428

FOREIGN PATENT DOCUMENTS

FR            2 824 945 A1     11/2002
FR            3078565 A1  *     9/2019

OTHER PUBLICATIONS

French Preliminary Search Report issued Sep. 10, 2020 in French Application 20 01123, filed on Feb. 5, 2020, 3 pages (with English Translation of Categories of cited documents).

* cited by examiner

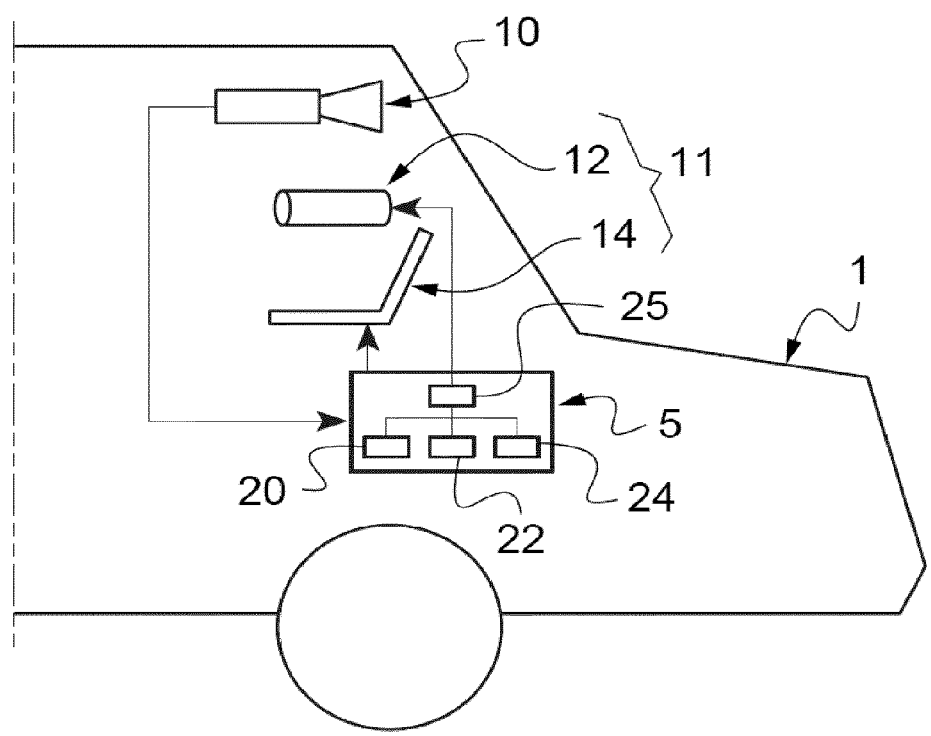

METHOD FOR PREPARING ROAD GUIDANCE INSTRUCTIONS

The present invention generally relates to guidance systems, and in particular (but not only) to the guidance systems integrated into motor vehicles.

It more particularly relates to a method for generating voice guidance instructions intended for an individual, comprising steps of:
  determining, by means of a computer, a route to be taken,
  acquiring at least one image of the environment of the individual,
  processing said image with a view to detecting therein at least one object present in the environment and to characterizing said object, and
  establishing and transmitting a voice guidance instruction informing the individual how to perform a maneuver in order to follow said route.

It also relates to a device for generating voice guidance instructions.

It preferably applies to the case where the individual is the driver of a motor vehicle.

Satellite navigation and positioning systems are particularly effective and appreciated ways of determining a route to be taken, in particular by a driver of a vehicle.

The advantage with respect to a paper map is considerable, especially because the position of the individual is updated in real time. Most navigation systems display the directions to follow on maps that correspond to schematic representations of the environment of the vehicle.

Generally, such a navigation system is designed to transmit route guidance instructions to the driver in two different ways, in visual form by virtue of a display screen, and in voice form by virtue of speakers with which the vehicle is equipped.

The visual representation of the maneuver to be performed on the display screen is not always clear because the maps distort the distances and angles between highways. It is sometimes difficult for the driver to correctly understand the maneuver to be performed.

The instructions of navigation systems, because of their visual representation and the associated voice instructions, are not always consistent and lead to misunderstandings on the part of the driver, with respect to the maneuver to be performed and to his conception of the road infrastructure, its configuration and the driving environment.

It will especially be noted that, currently, the voice guidance instructions are generated systematically, like an itinerary, depending on the distance between the vehicle and the next maneuver to be carried out.

It therefore frequently happens that these instructions are poorly suited to the environment, repetitive and predictable, or even out of step with what a driver would expect.

Another drawback of known navigation systems is that the instructions are generated disconnectedly. The instructions are independent of one another. The content of each instruction does not take into account the information conveyed in the preceding instructions and the information to be conveyed in the next instructions to come, which depends on the maneuvers that the driver must perform.

In practice, because of these drawbacks, a majority of users deactivate the voice function of the navigation system.

In order to remedy the aforementioned drawbacks of the prior art, the present invention provides a method for generating voice guidance instructions as defined in the introduction, wherein provision is made for a step of determining a level of complexity of said maneuver, and wherein, in the establishing step, said voice guidance instruction is formulated using a cue that is derived from the characterization of said object, only if the level of complexity of said maneuver is higher than a first threshold.

In other words, the invention proposes to generate voice guidance instructions the elaborateness of which depends on the complexity of the situation in question.

For example, if the driver is faced with a simple situation such as a crossroads, and no object obstructs the driver's view of the crossroads, the voice guidance instruction is generated without adding any particular detail thereto.

In contrast, in a more complex situation, for example because an object (such as a truck) hides one portion of the intersection, or because the intersection itself is more complex, the voice guidance instruction is generated with additional cues allowing the driver to determine where he is. These may be visual cues (for example the truck, a sign, road infrastructure) or other types of cue, such as for example contextual cues (in order for example to tell the driver when he must turn).

The invention thus proposes to generate voice guidance instructions in a way that is as similar as possible to the way in which a human co-driver would. In this way, the ease of comprehension of these instructions is increased and the frequency of these instructions is fitting, this making it possible to decrease the cognitive load placed on the driver, and decreasing driver errors and hesitations.

The following are other advantageous and non-limiting features of the method according to the invention, which features may be implemented individually or in any technically possible combination:
  said cue is a visual cue that is either currently visible by the individual or that will be visible thereby shortly, or a contextual cue that provides the individual with information as to when he must perform said maneuver;
  said voice guidance instruction is structured so that at least one action and said cue are inserted therein;
  the level of complexity is computed depending on at least one of the following criteria: the position of the vehicle with respect to the zone in which said maneuver must be performed, the type of road infrastructure present in the zone in which said maneuver must be performed, the tension felt by the individual, the density of road traffic, the number of objects detected in at least one portion of the acquired image, the individual's knowledge of the road infrastructure, the phase in which the vehicle is currently;
  if the road infrastructure is a roundabout, the level of complexity is computed depending on at least one of the following criteria: the angle between an axis of arrival of the individual at the roundabout and an axis of exit of the individual from the roundabout, the angle between at least two roads leading to the roundabout, the number of roads leading to the roundabout, the difference between the number of entrances to the roundabout and the number of exits from the roundabout, the number of lanes present in the roundabout, and the outside diameter of the roundabout;
  said cue being a visual cue visible to the individual, if, between the moment at which the voice guidance instruction was transmitted vocally and the moment when the maneuver must be performed, the visual cue disappears from the environment visible to the individual, provision is made for a step of generating a new voice guidance instruction not using said visual cue;

said cue being a visual cue visible to the individual, if, between the moment at which the voice guidance instruction was transmitted vocally and the moment when the maneuver must be performed, another visual cue that is indistinguishable from the visual cue used in the voice guidance instruction appears in the environment visible to the individual, provision is made for a step of generating a new voice guidance instruction different from the voice guidance instruction that was transmitted vocally;

if the level of complexity of said maneuver is higher than a second threshold strictly higher than said first threshold, said voice guidance instruction is generated using two cues;

provision is made to determine a cost relating to an additional time or distance that an error in following said route would cause, and the level of complexity is determined depending on said cost;

provision is made to distinguish between at least two distinct and successive phases prior to the performance of said maneuver, namely a maneuver-anticipation phase, in which a voice guidance instruction may be transmitted to indicate to the individual how to position himself to approach the maneuver, and a description phase, in which a voice guidance instruction is transmitted to indicate to the individual how to perform the maneuver, the voice guidance instructions transmitted in these phases using distinct cues;

during the anticipation phase, provision is made to verbalize a voice guidance instruction if the road taken or to be taken contains a plurality of lanes;

the cue used during the anticipation phase in the voice guidance instruction refers to signs only if the individual is located outside a built-up area;

provision is further made for at least one other phase which follows the description phase and in which a voice guidance instruction may be generated, said other phase being an accompaniment phase simultaneous to said maneuver, ora reassurance phase subsequent to said maneuver and allowing it to be indicated to the individual whether he has performed the maneuver correctly, or a continuity phase allowing the individual to be informed of the active character of said generating method;

if the voice guidance instruction transmitted during the description phase did not refer to any visual indicator and the vehicle slows down, provision is made in the accompaniment phase to transmit a voice guidance instruction using a cue;

in the reassurance phase, provision is made to transmit a voice guidance instruction using a visual indicator distinct from the one or more visual cues used in the one or more voice guidance instructions transmitted during the preceding phases; and in the continuity phase, provision is made to generate a different voice guidance instruction depending on whether the radius of curvature of the road taken is lower or higher than a threshold.

According to one aspect of the invention, the step of determining, by means of a computer, a route to be taken comprises retrieving, from a map database, static visual indicators located on said route and attributes associated with said static visual indicators, and determining an attribute common to a plurality of static visual indicators. The voice guidance instruction is formulated in the establishing step using a cue comprising the common attribute when the object is characterized as comprising the common attribute in the image-processing step.

According to one aspect of the invention, the static visual indicators are road signs, the common attribute comprises a name that is written on a road sign or a background color of a road sign, and the object is a road sign.

According to one aspect of the invention, the step of processing said image comprises detecting a plurality of objects, and the generating method further comprises a step of classifying the detected objects, an object characterized as having the common attribute being prioritized, the object selected for the establishing step being the prioritized object.

The invention also provides a device for generating route guidance instructions that are tailored to the environment, comprising:
  a means for acquiring images of the environment,
  a map database,
  a navigation and geolocation system,
  a processing module that is suitable for receiving and combining elements originating from the acquiring means, from the map database and from the navigation and geolocation system, and that is programmed to implement a method such as mentioned above, and
  a voice transmitter suitable for transmitting an indication to the individual.

Of course, the various features, variants and embodiments of the invention may be associated with one another in various combinations, provided that they are not incompatible with one another or mutually exclusive.

The description that follows with reference to the appended drawings, which are given by way of non-limiting example, will make it easy to understand of what the invention consists and how it may be implemented.

In the appended drawings:

FIG. 1 is a schematic view of a front portion of a motor vehicle equipped with a device for generating route guidance instructions according to the invention.

Preferably, the present invention will be able to be used in any motor vehicle (automobile, truck, motorcycle, etc.).

In FIG. 1, the passenger compartment of a motor vehicle 1 equipped with a device for generating route guidance instructions allowing the invention to be implemented has been shown schematically.

This device comprises means for acquiring images of the environment of the vehicle, a guidance unit 5 and an interface 11 suitable for transmitting guidance instructions to the driver of the motor vehicle 1.

The image-acquiring means for example here comprise a camera 10 that is oriented toward in front of the vehicle, and that makes it possible to acquire images of the environment seen by the driver when the latter has his gaze turned toward the road.

The interface 11 comprises at least one system for transmitting an audio signal 12. In addition, it here comprises a touch screen 14. As a variant, it could be devoid of screen.

The audio-signal-transmitting system 12 is designed to transmit voice indications to the individual. It is placed in the passenger compartment, at a distance from the individual such that the latter is able to clearly hear the communicated voice indications. For example, it is a question of loudspeakers installed in the vehicle with a view to allowing, for example, the radio to be listened to, or indeed of the loudspeaker of a portable system such as a telephone or an external navigation device.

The guidance unit 5 comprises a map database 20, a navigation and geolocation system 22, a computer memory (referred to just as the "memory 24" below) and a computer (referred to just as a "processing module 25" below).

The map database 20 comprises two-dimensional or even three-dimensional map data, and especially the locations (longitude and latitude) of highways in a given space (in Europe for example). The map database 20 also includes additional information such as the shape of buildings, the location of service stations and of characteristic places of the environment (for example historical monuments or rivers), the type of road surface (paved, earth, tarmacked, etc.). The map data are intended to be able to be read by the processing module 25.

Advantageously, the map database 20 comprises static visual indicators such as road signs and attributes associated with each road sign such as the background color of the sign and the direction or the name written thereon.

The navigation and geolocation system 22 is able to determine the current spatial position of the motor vehicle and to determine a route between the current position (or start position) of the motor vehicle 1 and the desired destination, based on the data stored in the map database 20. The navigation and geolocation system 22 may for example be a global positioning system (GPS). The current position of the vehicle and the route are intended to be able to be read by the processing module 25.

The route determined by the navigation and geolocation system 22 is stored in the memory 24. The memory 24 also stores parameters such as threshold values used in the implementation of the invention. All the elements stored in the memory 24 are capable of being read by the processing module 25. These elements will be described in detail further on in this description.

The processing module 25 is programmed to receive and combine the various elements originating from the camera 10, from the map database 20, from the navigation and geolocation system 22 and from the memory 24. The processing module 25 is also programmed to transmit data to the speakers 12 and to the screen 14, in order to communicate guidance indications to the individual. In practice, this processing module 25 is formed by a microcontroller.

The device for generating guidance instructions described above allows the method described below to be implemented.

Step S1: Determining the Route

This process begins when the motor vehicle 1 is started up. Then, the processing module 25 determines, in a first step, the route that the motor vehicle 1 must take.

To do this, the current (start) position is determined by virtue of the navigation and geolocation system 22. As a variant, the individual may specify a start position different from the position in which he is currently located by manually entering the target start position. For example, the individual may enter the target start position via the screen 14.

The individual then specifies a desired destination. For example, the desired destination may be input via the screen 14.

The processing module 25 combines the start position, the desired destination and the map data corresponding to the geographical zone in question. The processing module 25 transmits this information to the navigation and geolocation system 22, which then generates a route.

The determined route is stored in the memory 24.

Advantageously, the processing module 25 retrieves, from the map database 20, information on road signs that are located on said route, and attributes associated with said signs. As will be better explained below, the processing module 25 is able to determine whether a plurality of signs have a common attribute, to identify a common attribute and the signs comprising said common attribute.

The route is made up of lengths of road. A length of road is for example defined as being one portion of a highway extending between two successive intersections.

Each length of road may then be characterized by multiple parameters, such as, for example, the number of lanes it comprises, the one or more directions in which it is permitted to drive, the type of intersection, the number of entry and exit lanes at each intersection, etc.

The route passes through a high number of waypoints such as, for example:
  road infrastructure (an interchange, a roundabout, a crossing, etc.),
  municipalities or localities,
  significant places (pharmacy, bakery, mall, fountain, bus shelter),
  notable places (museum, monument, cathedral, station, airport, etc.).

At this stage, before the rest of the method is described, other concepts that will be useful to comprehension of the present description may be described.

The first concept is the concept "action". It is a question of a unit movement to be performed by the vehicle (for example "position yourself in the right-hand lane", "follow the red car").

The concept "target" designates the zone toward which the motor vehicle must move. It may be expressed in terms of elements of road infrastructure (traffic lights, stop signs, direction signs, highways, etc.).

The concept "maneuver" designates a sequence of one or more actions allowing an "objective" to be achieved. A maneuver is performed to change the position of the motor vehicle with respect to road infrastructure and to achieve the objective. For a given maneuver, a plurality of pairs consisting of one action and one target may be concatenated. For example, a maneuver may be worded in the following way: "Position yourself in the left-hand lane, then turn left onto freeway X".

The concept "cue" covers any linguistic element that may be used in a voice guidance instruction, and that, when it is used, is defined on the basis of images acquired by the camera, to facilitate comprehension of the situation by the driver of the vehicle.

The concept "visual cue" (or "visual indicator") designates static elements (highways, signs, road infrastructure, and more generally any element contained in the map database 20) or dynamic elements (vehicles, pedestrians or more generally any element detectable by the processing module 25 in the images acquired by the camera 10) that may be used to describe an action to be performed or when to perform it. These elements allow a guidance instruction to be enriched either by adding a detail thereto (for example "turn right after the lights") or by allowing it to be given with reference to this element (for example "continue past the blue building").

The concept "contextual cue" (or "temporal cue") designates when the maneuver must take place. This information indicates the time that the driver has to perform the maneuver. For example, such a cue will possibly be worded in the following way: "now", "immediately", "as soon as possible", "at the roundabout", "at the traffic lights".

The concept "attribute", with respect to a visual cue or a target, designates a characteristic of this visual cue or of this target, allowing the latter to be differentiated from other indicators. It may be a question of a color, of a text, of a direction, of a type of highway, of a lane width, of a type of road surface, etc.

Two categories of attributes may be considered:
- egocentric attributes, i.e. attributes relating to the position of the motor vehicle 1 (location of the target with respect to the position of the vehicle, position of the various elements surrounding the vehicle, number of the exit from a roundabout given the position of the vehicle, position in which to be in a lane, etc.),
- allocentric attributes, i.e. attributes positioned absolutely (location of a visual cue with respect to one or more fixed indicators of the environment, which therefore does not vary with the position of the vehicle—for example a number of a lane on a multi-lane highway, etc.).

A target will generally be an egocentric attribute, whereas a visual cue will generally be an allocentric attribute.

The concept "familiarity criterion" designates linguistic elements that allow the human side of the formulation of a guidance instruction to be reinforced. For example, it may be a question of formulations such as "now just stay in your lane", "first of all, head toward", "then take a left". This concept also designates linguistic elements that have a safety function (for example "look out for the bend!").

The concept "geographical indicator" will be used to designate the position of a visual cue with respect to a target, and will possibly be worded thus: "at the end of", "just after", "between", "completely to the right", "slightly to the right", "opposite", "straight ahead", "in the direction of", etc.

Step S2: Acquiring Video

Once the vehicle has started up, the camera 10 acquires images of the environment of the vehicle, and transmits them to the processing module 25. All or only some of the images acquired by the camera 10 may be processed by the processing module 25, at a frequency higher than one hertz.

The processing module 25 is programmed to process these images so as to generate voice guidance instructions that communicate to the driver especially which maneuver he will be required to perform shortly. It is programmed to generate at least one portion of these instructions taking into account the environment visible to the driver.

As the vehicle is following the route defined by the driver, the processing module 25 follows the progress of this vehicle by virtue of the navigation and geolocation system 22. This allows it to predict, before each intersection, whether the vehicle must carry out a maneuver and, if so, which maneuver it must carry out.

Each maneuver that the vehicle has to carry out is then broken down by the processing module 25 into five successive phases, in each of which a voice guidance instruction will possibly, if necessary, be generated and then transmitted.

The first phase is an anticipation phase allowing the driver to be told how to position his vehicle on the road in order to approach the next event (intersection, roundabout, etc.) in the best possible way.

The second phase is a description phase allowing the driver to be informed of the maneuver that he will have to perform, so that he may understand it before having to execute it.

The third phase is an accompaniment phase dedicated to assisting the driver during the maneuver in order to boost his confidence.

The fourth phase is a reassurance phase allowing confirmation to be given to the driver that he performed the correct maneuver.

The fifth phase, which occurs when two maneuvers are separated from each other by a distance or time greater than a predefined threshold, is a reassurance phase that allows the driver to be shown that the processing module 25 is still active (after a prolonged absence of guidance instructions).

A guidance instruction will then possibly be generated in each of these five phases.

These guidance instructions are generated sequentially, in a plurality of successive steps that on the whole consist in detecting static and moving objects visible in the images, in identifying roads and the route in each acquired image, in positioning the detected objects on a map obtained from the map database 20, in associating the detected static objects with known static objects in the map database 20, and in applying statistical and/or continuity reasoning to the objects with a view to generating the voice guidance instruction.

In the present description, firstly a detailed description will be given of how the guidance instructions are generated. In a second part, details will be given of how these guidance instructions may be reinforced using objects of the environment that have been detected in the acquired images. Finally, in a third part, an indication will be given as to precisely how these instructions are generated in the phase in which the vehicle is currently (anticipation, description, accompaniment, etc.).

Step S3: Detecting Objects

The step of detecting moving and static objects in the image acquired by the camera 10 and attributes characterizing each of these objects is performed by the processing module 25, using existing artificial-intelligence, machine-learning technologies.

It will be noted that an object is here defined as an element of the environment that is potentially or actually visible to the driver of the vehicle.

The list of attributes depends on the type of object detected.

Thus, by way of illustrative example, if the object is a "4-wheeled motor vehicle", the attributes are as follows:
- category (automobile, light-duty truck, medium-duty truck, heavy-duty truck, bus, etc.),
- main color of the bodywork,
- direction in which it is being driven,
- part seen by the driver (front, rear, left side, right side),
- status (parked, stopped, running),
- orientation of the object with respect to the vehicle,
- percentage able to be seen.

A confidence index expressed in percent is given to the detected object and to each attribute. The closer the value of this confidence index is to 100%, the more readily the object and the attribute may be used. Below a predetermined threshold, the attribute or the object is no longer taken into account. The higher the number of attributes of a given object, the more readily this object will be able to be recognized in each iteration of the analysis of the scene (i.e. in each image processed).

Step S4: Positioning Objects

To identify the object or objects to be used in the formulation of the voice guidance instructions, the processing module 25 matches the objects detected in the processed image with data stored in the map database 20, this allowing the relationship of each object with respect to the environment and to the driver's perception to be understood.

To do this, the processing module 25 uses the data stored in the map database 20, and especially the objects that are referenced therein (point of interest, road sign, traffic light, bus stop, etc.) and their descriptions (name, type, color, etc.).

Next, the processing module 25 identifies roads and the route in the processed image.

Next, the processing module 25 positions each detected object on the map by matching the referenced objects with the detected objects. It also positions detected and non-referenced objects (vehicle, pedestrian, etc.) on the map.

Step S6: Classifying

At this stage, the processing module 25 classifies all the detected objects.

A first classification technique consists in using existing artificial-intelligence, machine-learning technologies.

This technique may consist in training the artificial intelligence to identify on its own at least ten detected objects, while focusing on the right-hand zone of the image if the vehicle must turn right, on the central zone if it must continue straight on, and on the left-hand zone if it must turn left, then in classifying these ten objects in order of importance.

A second classification technique consists in carrying out a statistical computation to assign a weight to each detected object.

This weight may be computed depending on criteria selected from the following list:
- the persistence of the object in the scene, image after image (the longer the object remains visible, the more its weight increases; if the presence of the object alternates between visible and not visible, its weight decreases),
- the area occupied by the object in the scene and the percentage thereof able to be seen (a truck is more visible than an automobile),
- the salience of the object (the more its color differs from the rest of the environment, the greater its weight; for example, a red vehicle is more visible than a gray vehicle),
- the uniqueness of the object (the use of a blue vehicle of which there is only one is less ambiguous than the use of a red vehicle among other red or orange vehicles),
- the position of the object with respect to the maneuver to be performed (the closer it is thereto, the greater its weight),
- the phase in which the vehicle is currently (as will be detailed further on in this description, depending on the phase, some classes of objects lend themselves better than others to the provision of guidance).

A third technique relates to a strategy based on continuity of visual cues on a route.

An object is prioritized for use in the generation of the instruction of step S7, which is described below, if an attribute of the object has been identified by the processing module 25 as being an attribute common to a plurality of objects or a cue that has already been used in the generation of a preceding guidance instruction of the current route and/or that is potentially usable to generate a subsequent guidance instruction on the same route.

Advantageously, the common attribute will have been identified by the processing module 25 when it determined the route S1.

For example, when determining the route S1, the processing module 25 identifies a plurality of road signs on which the name "Long Island" is written. The identified common attribute is the name "Long Island" which is written thereon. In the video-acquiring step S2, the camera 10 acquires an image comprising a sign. In the object-detecting step S3, the processing module 25 identifies the sign in the image and detects whether it is characterized by the precedingly identified common attribute. The attribute may be detected by deciphering in the image the name written on the sign or by obtaining a match, via geolocation, with a sign contained in the map database 20, said sign being associated with attributes that are also contained in the map database 20. In the classifying step S5, the processing module 25 prioritizes said sign, so as to ensure it will be used in the generation of the next guidance instruction in step S7.

Thus, if on the route, at a plurality of consecutive intersections, a sign is found on which the same name is written, the guidance instructions relating to these intersections will privilege use of a given visual cue, ensuring a continuity in the visual cues that guarantees consistency and that facilitates guidance of the user while decreasing the cognitive load placed thereon.

For example, on a route comprising a first roundabout followed by an intersection and a road from which it is necessary not to turn off, the following succession of guidance instructions is generated: "At the roundabout, turn right in the direction of Long Island", "continue straight on in the direction of the Long Island sign", "stay in your lane and continue in the direction of Long Island".

Step S7: Generating the Instruction

The guidance instruction is then generated, possibly using a cue that fits the context and the maneuver to be performed and that depends on the attributes of the selected object.

One objective is to describe at what moment and in what context an object must be used to generate the voice guidance instruction, so as to best help the driver to find his way.

The context especially depends on the complexity of the maneuver to be performed. This complexity is here estimated depending on at least one of the following criteria, and preferably depending on each thereof:
- the position of the vehicle with respect to the maneuver (if a lane change is necessary, the situation is considered to be more complex),
- the configuration of the road infrastructure (the more lanes an intersection has, the more complex it is judged to be),
- the driving context (driver tension, i.e. stress; dense traffic, etc.),
- the presence of a high number of objects in the driver's field of view,
- the driver's knowledge of the road infrastructure,
- the phase in which the vehicle is currently, and
- the statistical weight of the various detected visual indicators.

Here, preferably, a visual indicator is used in the voice guidance instruction only if it proves necessary.

If the situation is simple, i.e. if the level of complexity is lower than a first complexity threshold, it will be preferable not to use one, so as not to increase the cognitive load placed on the driver. Thus, it will be preferable to say "turn left at this intersection" rather than "turn left after the bus stop", because the latter instruction would require the driver to locate the bus stop and the intersection rather than just the intersection.

In contrast, if the level of complexity is higher than this first complexity threshold, the instructions are generated using temporal or visual cues (or "indicators"), this improving comprehension of the maneuver to be performed. This is referred to as "reinforcement of the voice guidance instruction".

This reinforcement may be carried out in various ways, depending on various parameters.

A first way of reinforcing a voice guidance instruction consists in employing, in the instruction, a notion of time to facilitate comprehension of the action to be performed. This may be illustrated by a plurality of examples using context cues.

In a first example, if traffic is dense or if an object is preventing the maneuver or is hiding the goal of the maneuver, the processing module 25 is programmed to integrate a contextual cue such as "as soon as possible" into the middle of the guidance instruction, so that the driver feels free to reposition his vehicle at the best moment.

In a second example, if performance of the maneuver is possible and must be immediate, the processing module 25 is programmed to incorporate another contextual cue such as "now" or "immediately", so that the driver repositions his vehicle without delay.

In a third example, if performance of the maneuver is possible but not required immediately, the processing module 25 is programmed to incorporate a contextual cue such as "as soon as possible", so that the driver feels free to reposition his vehicle at the best moment.

Each guidance instruction is then formed by placing one after another at least one action, one contextual cue and one attribute.

In the case of a guidance instruction concatenated with another guidance instruction, the processing module 25 is programmed to replace the contextual cue "as soon as possible" with "then" or "after".

In this case, the complete guidance instruction is formed by placing one after another an action and an egocentric attribute, concatenated with an action, a contextual cue and another attribute.

For example, this complete guidance instruction may be expressed in the form "turn right then, then bear left", or "turn right then, afterwards, bear left", or "turn right then subsequently follow directions to Long Island".

A second way of reinforcing a voice guidance instruction consists in employing a mobile indicator to facilitate comprehension of the action to be performed. This way is used when the object detected in the acquired image that has the greatest weight is a mobile indicator.

The processing module 25 may be considered to have successfully:
  detected the various types of mobile indicators (cars, trucks, buses, vans, bicycles, motorcycles),
  positioned the mobile indicators on the lanes of the map obtained from the map database 20,
  detected the attributes of these mobile indicators, so as to differentiate them from one another,
  identified a unique mobile indicator that will be able to be seen by the driver without ambiguity, by characterizing it at least by its type, its color, and its position, and
  identified that the unique mobile indicator is stable (i.e. that it appears in the various successively processed images).

In this case, the processing module 25 is programmed to use this unique mobile indicator to help the driver to position his vehicle correctly.

The complete guidance instruction is then formed by placing one after another an action, a geographical indicator, a visual cue and an attribute.

For example, this guidance instruction may be expressed in the form "position yourself in the same lane as the red car".

A third way of reinforcing a voice guidance instruction consists in employing a static indicator, such as an element of road infrastructure, to facilitate comprehension of the action to be performed. This way is used when the object detected in the acquired image that has the greatest weight is a static indicator.

The processing module 25 may be considered, to have done this, to have successfully:
  detected the various types of static indicators (bridges, traffic lights, etc.),
  associated the detected static indicators with objects stored in the map database 20,
  detected the attributes of these static indicators, so as to differentiate them from one another,
  identified a unique static indicator that will be able to be seen by the driver without ambiguity, by characterizing it at least by its type, its color, and its position, and to have successfully
  identified that the indicator is stable.

In this case, the processing module 25 is programmed to use this unique static indicator to help the driver to position his vehicle correctly.

The complete guidance instruction is then formed by placing one after another an action, a target, a geographical indicator and a visual cue.

For example, this complete guidance instruction may be expressed in the form "take the exit just after the bridge".

A fourth way of reinforcing a voice guidance instruction consists in employing a direction sign to facilitate comprehension of the action to be performed. This way is used when the object detected in the acquired image that has the greatest weight is a sign.

The processing module 25 may be considered, to have done this, to have successfully:
  detected the various types of signs and their attributes (traffic lights, stop signs, etc.),
  associated the detected signs with the signs contained in the map database 20, with the aim especially of determining the attributes of each sign (color, text, direction indicated, etc.),
  thus determined the attributes of each sign, so as to differentiate between them,
  identified a unique sign that will be able to be seen by the driver without ambiguity (by virtue of its color, the text that is written thereon, etc.),
  identified that the sign is stable (and especially that the text or the displayed shape will not change in the short term).

In this case, the processing module 25 is programmed to use this unique sign and its attributes to help the driver to position his vehicle correctly.

The complete guidance instruction is then formed by placing one after another an action, a geographical indicator, an egocentric attribute and an objective.

For example, this complete guidance instruction may be expressed in the form "position yourself in the left-hand lane heading in the direction of the green sign".

A fifth way of reinforcing a voice guidance instruction consists in employing a significant place (restaurant, pharmacy, etc.) to facilitate comprehension of the action to be performed. This way is used when the object detected in the acquired image that has the greatest weight is a significant place.

The processing module 25 may be considered, to have done this, to have successfully:
  detected the various types of static indicators forming significant places,
  associated the detected static indicators with indicators contained in the map database 20, detected the attributes of these indicators, so as to differentiate them from one another,
identified a unique indicator that will best be able to be seen by the driver without ambiguity on account of its attributes (type of indicator, color and position), and identified that the indicator is stable.

In this case, the processing module 25 is programmed to use this significant place and its attributes to help the driver to position his vehicle correctly.

The complete guidance instruction is then structured by placing one after another an action, an egocentric attribute, a geographical indicator, and a visual cue.

For example, this guidance instruction may be expressed in the form "turn right just after the restaurant".

A sixth way of reinforcing a voice guidance instruction consists in employing a notable place (known significant building the function of which will not change over the next few years, such as a monument, a cathedral, etc.) to facilitate comprehension of the action to be performed. This way is used when the object detected in the acquired image that has the greatest weight is a notable place.

In this case, to help the driver to position his vehicle correctly, the processing module 25 is programmed to use only the name of this notable place and not to add any attributes.

The complete guidance instruction is then structured by placing one after another an action, an egocentric attribute, a geographical indicator, and a visual cue.

For example, this complete guidance instruction may be expressed in the form "turn right just after the Empire State Building".

A seventh way of reinforcing a voice guidance instruction consists in employing two significant and/or notable places to facilitate comprehension of the action to be performed. This way is used when the object detected in the acquired image that has the greatest weight is a notable or significant place, and when one of the other detected objects is also a notable or significant place.

The processing module 25 may be considered, to have done this, to have successfully:
detected the various types of static indicators forming significant or notable places,
associated the detected static indicators with indicators contained in the map database 20,
detected the attributes of these indicators, so as to differentiate them from one another,
identified that the target of the maneuver is located between 2 detected static indicators that will be able to be seen by the driver without ambiguity,
identified that these indicators are stable.

In this case, the processing module 25 is programmed to use these notable or significant places and their attributes to help the driver to position his vehicle correctly.

The complete guidance instruction is then formed by placing one after another an action, an egocentric attribute, a geographical indicator, a first visual cue and a second visual cue.

For example, this complete guidance instruction may be expressed in the form "turn right between the church and the pharmacy".

An eighth way of reinforcing a voice guidance instruction consists in using characteristics of the road to facilitate comprehension of the action to be performed.

Specifically, the map database 20 stores information on highway characteristics that may be used in the context of the present invention.

The processing module 25 may then be considered to have successfully detected an attribute that differentiates the highway to be taken from the other highways visible to the driver.

In this case, the processing module 25 is programmed to use this attribute to help the driver to position his vehicle correctly.

The complete guidance instruction is then formed by placing one after another an action, an egocentric attribute and a target, or even also an attribute of the target.

For example, this complete guidance instruction may be expressed in the form "turn right into the side road" or "turn right into the small street" or "turn right onto the paved road".

A ninth way of reinforcing a voice guidance instruction is used when a reinforcement of the guidance instruction would have been recommendable in the anticipation or description phases, but no visual indicator was then available, whereas, in the accompaniment phase, a visual indicator is available.

In this case, the processing module 25 is programmed to use this visual indicator to generate a reinforced voice guidance instruction at the earliest possible opportunity.

This visual indicator may be used before the driver is able to see it (in the description phase or even in the anticipation phase) or from the moment he is able to see it. It is especially possible to envision the processing module 25 ordering repetition of a voice guidance instruction, the latter being supplemented using this visual cue.

A tenth way of reinforcing a voice guidance instruction is used depending on the complexity of the maneuver to be performed and on the detected level of hesitation.

Thus, when the complexity of the maneuver is judged to be very high (higher than a second predetermined complexity threshold) or when the level of hesitation of the driver exceeds a predetermined threshold, provision is made to associate a plurality of types of reinforcements.

The drivers level of hesitation may be assessed in various known ways, for example depending on the path taken (whether it deviates from the expected one), on oscillations in the steering wheel, on the way in which the steering wheel is being held, on the position of the driver, etc.

A first example of association consists in employing, in the voice guidance instruction, a reinforcement using a notion of time and any other type of reinforcement.

A second example of association consists in employing a reinforcement using a significant place or a notable place and a reinforcement using the characteristics of the road to be taken.

In this example, the complete guidance instruction is then formed by placing one after another an action, an egocentric attribute, a geographical indicator, a visual cue, a target and an attribute of the target. This complete guidance instruction may then be expressed in the form "turn right just after the Empire State Building into the small side road".

A third example of association consists in employing a reinforcement that uses directional signs and a reinforcement that uses a significant place or a notable place.

A fourth example of association consists in employing two reinforcements that use a significant place or a notable place.

In this example, the complete guidance instruction is then formed by placing one after another an action, an egocentric attribute, a visual cue, a geographical indicator, and another visual cue. This complete guidance instruction may be expressed in the form "turn right after the Empire State Building between the church and the pharmacy".

A fourth example of association consists in employing a reinforcement that uses a mobile indicator and a reinforcement that uses a fixed indicator or an element of road infrastructure.

In this example, the complete guidance instruction is then formed by placing one after another an action, an egocentric attribute, a first visual cue, another visual cue and an attribute of the cue. This complete guidance instruction may be expressed in the form "turn left after the traffic lights like the red car".

It has been taught above that in a low-complexity situation, the voice guidance instruction is not reinforced.

It has also been taught that the level of complexity of a maneuver depends on a plurality of variables.

Preferably, provision may be made for the level of complexity to also depend on another parameter, namely the cost, in terms of time or distance, that an error by the driver (if he took a wrong exit say) would result in.

Thus, when the processing module 25 predicts that if an error were made by the driver during the maneuver, this error would add a lot of time to the remaining journey, it is programmed to increase the value of the level of complexity, this leading to reinforcement of the voice guidance instruction.

It will therefore be understood that, in this particular case, provision is also made to resort more frequently, or even systematically, to combination of a plurality of reinforcements, such as was detailed above.

Specifically, the processing module 25 must provide, to the driver, a guarantee of the success of the maneuver if non-performance of this maneuver will have a significant impact on the estimated time of arrival at the destination. This situation especially arises on freeways, or on roads that have few entrances and exits, or on one-way roads.

In practice, the processing module 25 is programmed to compute the additional time that will be required to reach (or the additional distance to) the destination should the driver go the wrong way during the maneuver to be performed. Thus, above a predetermined threshold (expressed in terms of time or distance or percentage of the time remaining before arrival at the destination), the processing module 25 will generate a voice guidance instruction that is more reinforced than it would be if the computed time were lower than this threshold.

Preferably, the processing module 25 may further use a firmer than usual intonation when verbalizing the voice guidance instruction, so as to make the driver understand the importance of performing the correct maneuver.

The cost of non-performance of the maneuver (and therefore the choice as regards generation of a more reinforced voice guidance instruction) may also be computed depending on other parameters (type of route, type of road, etc.) and may be increased in clearly identified cases, for example in cases where:
- the vehicle is not correctly positioned to perform the maneuver,
- the vehicle is correctly positioned with respect to the maneuver to be performed but the relevant direction-indicator lamp has not been activated,
- the driver has not acted as suggested before the end of the anticipation phase or before the end of the description phase.

In these cases, the processing module 25 will possibly be programmed to repeat the voice guidance instruction but with an emphasis added thereto, e.g. "now position yourself in the . . . lane", or with another reinforcement allowing the maneuver to be performed to be emphasized added thereto, e.g. "now position yourself in the . . . lane . . . in the direction of . . . ".

As the vehicle advances, the context will possibly change, making a guidance instruction ambiguous at best and obsolete at worst.

Two cases may thus be envisioned.

The first case is when an element gets between the vehicle and the object selected for generation of a guidance instruction, preventing the driver from seeing this object.

The second case is when another object that is analogous to the one selected for generation of a guidance instruction appears in the driver's field of view. This situation may for example arise when a bus leaves its stop and reveals a second bus stop.

These two situations will result in an increase in the driver's stress level and cognitive load, and generate a risk of error or of the maneuver being performed late.

In these two cases, the processing module 25 will then be programmed to generate a new instruction that fits the new context.

As mentioned above, the voice guidance instruction to be verbalized varies depending on the phase in which the vehicle is currently. Thus, how this guidance instruction will be formulated in each of these phases will now be described.

Anticipation Phase

It will be recalled that the anticipation phase takes place before the maneuver to be performed. It begins and ends at a distance from the zone in which the maneuver will be performed. It allows the driver to position the vehicle as best as possible and/or to prepare to carry out this maneuver (especially when the target of the maneuver will only become visible at the last minute).

In such an anticipation phase, the reinforcement of voice guidance instructions is recommendable, but the use of notable or significant places is avoided.

The processing module 25 is programmed to verbalize what is referred as an anticipatory voice guidance instruction, when the length of road being taken contains a plurality of lanes.

The way in which this anticipatory guidance instruction is reinforced will possibly vary depending on the situation encountered.

Normally (i.e. in situations other than those considered below), the reinforcement is performed in the following manner.

If the vehicle is located on a multi-lane highway and is positioned in the lane most compatible with the performance of the next maneuver, the processing module 25 is programmed to generate an anticipatory voice guidance instruction to reassure the driver.

The voice guidance instruction is then formed by placing one after another an action, a familiarity criterion, a geographical indicator and an egocentric attribute.

For example, this voice guidance instruction may be expressed in the form "stay in your lane".

If the vehicle is located on a multi-lane road and is positioned in a lane that is compatible with the performance of the next maneuver (typically, if there is no solid white line between the lane in which the vehicle is located and the point of the next maneuver) but a lane change is required, the processing module 25 is programmed to generate an anticipatory voice guidance instruction directing the driver to change lanes quickly.

The voice guidance instruction is then formed by placing one after another an action, a geographical indicator and a contextual cue.

For example, this voice guidance instruction may be expressed in the form "now (or as soon as possible) position yourself in the x lane".

If the vehicle must enter a multi-lane road and the vehicle is located in an entry lane of limited length, the processing module 25 is programmed to generate an anticipatory voice guidance instruction directing the driver to change lane.

The voice guidance instruction is then formed by placing one after another at least one action and one geographical indicator.

For example, this voice guidance instruction may be expressed in the form "get into the lane".

If the vehicle has to enter a multi-lane road and the vehicle is located on an entry lane of unlimited length (i.e. one that merges with a lane of the road) and this lane is the most compatible with performance of the next maneuver, the processing module 25 is programmed to generate an anticipatory voice guidance instruction directing the driver to stay in this lane.

The voice guidance instruction is then formed by placing one after another at least one action, one geographical indicator and one egocentric attribute.

For example, this guidance instruction may be expressed in the form "stay in your lane".

If the vehicle must enter a multi-lane road and the vehicle is located on an entry lane of unlimited length and this lane is not the most compatible with the next maneuver to be performed, the processing module 25 is programmed to count the number of changes of lane required to reach the most compatible lane, then to generate an anticipatory voice guidance instruction directing the driver to change lanes.

The voice guidance instruction is then formed by placing one after another at least one action and attribute.

For example, this voice guidance instruction may be expressed in the form "position yourself in the nth lane".

In this situation, the way in which to which lane the vehicle must move is expressed may be determined in the following way.

In the absence of constraint on the lane to be taken among the plurality of lanes of the highway, the processing module 25 is programmed to generate a voice guidance instruction directing the driver just to enter.

The complete guidance instruction is then formed by placing one after another at least one action and one target.

For example, this guidance instruction may be expressed in the form "enter . . . ". The name of the road or its type may then be specified.

If the highway has only two lanes of traffic, the processing module 25 is programmed to generate a voice guidance instruction indicating whether the vehicle must place itself in the "right-hand" or "left-hand" lane.

The guidance instruction is then formed by placing one after another at least one action, one geographical indicator and one egocentric attribute.

If the highway has exactly three traffic lanes, the processing module 25 is programmed to generate a voice guidance instruction indicating whether the vehicle must place itself in the "right-hand" or "left-hand" or "middle" lane.

The guidance instruction is then formed by placing one after another at least one action, one geographical indicator and one egocentric attribute.

If the highway has exactly four traffic lanes and only one of them is compatible with the maneuver to be performed, the processing module 25 is programmed to generate a voice guidance instruction indicating whether the vehicle must place itself in the "rightmost" or "leftmost" lane or the "second lane" or "third lane".

The guidance instruction is then formed by placing one after another at least one action, one geographical indicator and one allocentric attribute.

If the highway has exactly four traffic lanes and a plurality of them are compatible with the maneuver to be performed, the processing module 25 is programmed to generate a voice guidance instruction indicating whether the vehicle must place itself in the "rightmost" or "leftmost" or "middle" lanes.

The guidance instruction is then formed by placing one after another at least one action, one geographical indicator and one allocentric attribute.

If the highway has an uneven number of traffic lanes higher than four and only the middle one is compatible with the maneuver to be performed, the processing module 25 is programmed to generate a voice guidance instruction indicating that the vehicle must place itself in the "middle" lane.

The guidance instruction is then formed by placing one after another at least one action, one geographical indicator and one allocentric attribute.

If the highway has a plurality of lanes and at least one of them is closed to the vehicle, the processing module must integrate this into the lane count.

When the vehicle is located outside a built-up area, the reinforcement of the voice guidance instruction in the anticipation phase may preferentially indicate to the driver the reason why he is positioning himself as he is (i.e. the objective thereof) by describing the next maneuver to be performed.

The objective is thus indicated with regard to the distance between the vehicle and the maneuver, with regard to the type of maneuver to be carried out (freeway exit, interchange, roundabout, etc.) and to the road infrastructure visible to the driver (direction signs, etc.).

On highways, the processing module 25 must use a visual indicator, which will preferably be static (of the direction-sign type), or else (in the absence of such a sign) a mobile indicator, or else (in the absence of a sign and of a mobile indicator) an element of road infrastructure.

The following examples illustrate this rule.

If the processing module 25 detects a sign and it is capable of reading the writing marked thereon, it is programmed to generate an anticipatory voice guidance instruction directing the driver to follow the direction indicated thereon.

The complete guidance instruction is then formed by placing one after another at least one action, one geographical indicator, one egocentric attribute, one objective, one geographical indicator, one visual cue and one attribute.

For example, this voice guidance instruction may be expressed in the form "position yourself in the left-hand lane ready to take the exit in the direction of . . . ".

If the processing module 25 detects a sign and it is not capable of reading the writing marked thereon but the map database 20 contains this information, then it acts in the same way as above.

If the processing module 25 detects among other signs a sign the color of which is unique, it is programmed to generate a voice guidance instruction directing the driver to follow the direction of the sign of the identified color.

The voice guidance instruction is then formed by placing one after another at least one action, one geographical indicator, one egocentric attribute, one objective and one attribute.

For example, this guidance instruction may be expressed in the form "position yourself in the left-hand lane ready to follow the blue sign". If the writing on the sign is readable or known, this instruction may be supplemented by indicating the direction that is indicated thereon.

When the vehicle is located in a built-up area, signs are more frequently hidden or covered by vegetation. Consequently, the processing module 25 must identify the most relevant visual cue among other indicators, including:
mobile indicators,
elements of the road infrastructure,
static indicators other than signs, and
significant or notable places.

The following four examples illustrate this situation.

In a first example, the processing module 25 generates the following guidance instruction: "position yourself in the same lane as the red car". In this example, the guidance instruction is formed by placing one after another at least one action, one geographical indicator, one visual cue and one attribute.

In a second example, the processing module 25 generates the following guidance instruction: "position yourself in the left-hand lane heading in the direction of the green sign". In this example, the guidance instruction is formed by placing one after another at least one action, one geographical indicator, one egocentric attribute, one geographical indicator, one visual cue and one attribute.

In a third example, the processing module 25 generates the following guidance instruction: "position yourself in the left-hand lane then at the roundabout take the $3^{rd}$ exit". In this example, the guidance instruction is formed by placing one after another at least one action, one geographical indicator, one visual cue, one concatenation element, another visual cue, an action and an allocentric attribute.

In a fourth example, the processing module 25 generates the following guidance instruction: "position yourself in the right-hand lane ready to turn right at the crossroads". In this example, the guidance instruction is formed by placing one after another at least one action, one geographical indicator, one visual cue, one objective and another visual cue.

Phase of Description of the Maneuver

The second phase is the description phase. In this second phase, the voice guidance instruction, which is referred to as the description voice guidance instruction, characterizes the action that will have to be performed to reach the target.

In this instruction, the processing module 25 delivers the information that the driver requires to determine where he is and to locate the target with respect to his environment (and especially with respect to the detected visual indicators).

When the vehicle reaches an intersection, the processing module 25 computes the angle of each road starting from the intersection, with respect to the road on which the vehicle is on. This angle is expressed for example in degrees and is comprised between −180° and 180°.

The guidance instruction may then be reinforced by a geographical attribute tailored to the intersection, which may be "completely to the right" or "facing" (or "straight on").

The way in which the guidance instruction is reinforced may vary depending on the type of intersection.

For a T-shaped intersection, in the case where the vehicle arrives at a road forming the horizontal of the T via the vertical of the T, the processing module 25 will possibly be programmed to employ the word "intersection".

If the angle between the vertical and the horizontal of the T is substantially perpendicular (for example within 10, 20 or 30 degrees), the processing module 25 will employ the verbs "turn" or "take".

If the angle between the vertical and the horizontal of the T is not substantially perpendicular, two cases must be considered.

The first case is that in which the vehicle, at the intersection, must deviate by an angle substantially smaller than 90 degrees with respect to its initial trajectory. In this case, the processing module 25 will supplement the verbs used with the expression "slightly to". It will further favor use of the verb "take" over the verb "turn".

The second case is the one in which the vehicle, at the intersection, must deviate by an angle substantially larger than 90 degrees with respect to its initial trajectory. In this case, the processing module 25 will supplement the verbs used with the expression "completely to". It will further favor use of the verb "turn" over the verb "take".

An intersection of "fork" type is an intersection composed of an entry lane and of exactly two exit lanes located in the extension of the entry lane.

The way in which a voice guidance instruction is formulated at such an intersection will then depend on the configuration of the site in question.

In the case where the two exit lanes are to the right of the entry lane, if the vehicle must take the rightmost lane, the instruction will be formulated using an expression such as "take the rightmost lane". In contrast, if the vehicle must take the other exit lane, it will be necessary to reinforce the guidance instruction to indicate to the driver which one he must take.

Conversely, in the case where the two exit lanes are to the left of the entry lane, if the vehicle must take the leftmost lane, the instruction will be formulated using an expression such as "take the leftmost lane". In contrast, if the vehicle must take the other exit lane, it will be necessary to reinforce the guidance instruction to indicate to the driver which one he must take.

In the case where the two exit lanes are on either side of the entry lane, the instruction will be formulated using an expression such as "take the left-hand lane" or "take the right-hand lane".

At a roundabout, the voice guidance instruction will be defined depending, especially, on the number of exits from the roundabout.

A roundabout comprises an annular road and roads leading to this central road, which roads are called "adjacent roads" below. It has entrances and exits, an entrance and an exit possibly being located on the same adjacent road.

It will be noted that the complexity of a roundabout will depend on the following criteria:
angle between the road on which the vehicle arrives and the road on which it must exit,
angle between the exit to be taken and those nearby,
number of adjacent roads,
difference between the number of entrances and the number of exits,
number of lanes on the annular road,
outside diameter of the roundabout.

A roundabout will be qualified simple if it has as many entrances as exits distributed in pairs on adjacent roads, if the number of adjacent roads is lower than or equal to four, if these adjacent roads are oriented in clearly different directions, and if priority on the roundabout is given to vehicles being driven on the annular road. In other cases, the roundabout will be qualified complex.

A first example of a simple roundabout is a roundabout the adjacent roads of which are four in number, and separated angularly by about 90 degrees. Reference will be made to an "orthogonal roundabout". In this example, the processing module 25 will possibly be programmed to verbalize a voice guidance instruction such as "at the roundabout, exit right (or left or continue straight)".

A second example of a simple roundabout is a roundabout the adjacent roads of which are three or four in number, and separated angularly pairwise by angles at least one of which is substantially different from 90 degrees. In this example, the processing module 25 will possibly be programmed to verbalize a voice guidance instruction reinforced by the number of the exit lane to be taken. This instruction will possibly be expressed in the form "at the roundabout, take the first exit on the right".

A third example of a simple roundabout is a roundabout of small diameter. In this example, the processing module 25 will consider this roundabout to be a simple crossroads (see below).

A voice guidance instruction describing a maneuver allowing a complex roundabout to be navigated will always be reinforced.

Various examples may be given in which the instructions will be reinforced.

In a first example, the roundabout does not have four pairwise orthogonal exits.

Thus, a first case to be considered is that in which the exit is orthogonal (to within 10 degrees) to the entry lane via which the vehicle arrives and corresponds to the first or to the second exit. In this eventuality, the processing module 25 is programmed to preferentially verbalize a voice guidance instruction reinforced by the number of the exit to be taken. This instruction will possibly be expressed in the form "at the roundabout, take the first exit on the right".

A second case to be considered is that in which the exit is not orthogonal to the entry lane via which the vehicle arrives and corresponds to the first or to the second exit. In this eventuality, the processing module 25 is programmed to obligatorily verbalize a voice guidance instruction reinforced by the number of the exit to be taken. This instruction will possibly be expressed in the form "at the roundabout, take the first exit on the right".

A third case to be considered is that in which the exit corresponds to the third exit or to a subsequent exit. In this eventuality, the processing module 25 is programmed to verbalize a voice guidance instruction reinforced by an allocentric attribute. This instruction may be expressed in the form "take the exit on the left just before the restaurant".

A second example of a complex roundabout is a roundabout in which the numbers of entrances and exits differ.

It is especially possible to consider the case in which there is one entrance more than there are exits, this entrance being located on a one-way adjacent road different from the lane via which the vehicle arrives.

In this example, the processing module 25 applies the rules defined in the preceding example, while sometimes refraining from indicating the exit to be taken by its number.

Thus, if the exit to be taken is located after the one-way entrance, the processing module 25 is programmed to verbalize a voice guidance instruction reinforced by an allocentric attribute, and not to indicate an exit number. This instruction will possibly be expressed in the form "take the exit on the right next to . . . ".

In contrast, if the exit to be taken is located before the one-way entrance, the processing module 25 is programmed to verbalize a voice guidance instruction in the same way as in the first example given above of a complex roundabout.

A third example of a complex roundabout is a roundabout in which the exits are very close in distance or angle to each other. In particular, a roundabout is considered complex when the angle between two exits is smaller than or equal to 30°.

In this example, the processing module 25 applies the same rules as those applied in the first example given above of a complex roundabout, while obligatorily reinforcing the voice guidance instructions.

A fourth example of a complex roundabout is a roundabout in which vehicles arriving at the roundabout have priority over those already being driven around the roundabout (the roundabout of the Place de l'Etoile in Paris, France is the most famous example of this type of roundabout).

In this example, the processing module 25 applies the same rules as those applied in the first example given above of a complex roundabout, while obligatorily reinforcing the voice guidance instructions with a warning such as: "Watch out! Vehicles coming from the right have priority on the roundabout".

At a crossroad with at least four lanes leading therefrom, the processing module 25 applies the same rules as those applied in the various examples of roundabouts given above, replacing the term "roundabout" with "crossroads" or "intersection".

The processing module 25 may especially count the exits from the lane of the vehicle, this time counting all the lanes, even those that are one-way or no entry.

If the exit lane to be taken is offset with respect to the other exit lanes, the processing module 25 is programmed to add to the instruction a command such as "advance through the crossroad and take the 2nd exit on the left in the direction of . . . ".

Phase of Accompaniment of the Maneuver

The accompaniment phase is essentially intended to indicate to the driver the exact moment when he may begin the actual maneuver, i.e. the change in direction. In this phase, the processing module 25 transmits what is referred to as an accompaniment voice guidance instruction only if it is judged that crossing the intersection will be complex.

In this situation, whether the voice guidance instruction is reinforced or not and the way in which it is reinforced depends on the type of intersection.

Thus, when a plurality of T-shaped intersections follow one after another on the road and no visual indicator (infrastructure, sign, notable place, etc.) is present nearby to differentiate between them, the processing module 25 will be programmed to verbalize an accompaniment voice guidance instruction. This instruction will include a contextual cue and may be formulated in the following way: "now turn right . . . ".

At an intersection of fork type, no accompaniment voice guidance instructions will be transmitted.

At a roundabout, if the diameter of the roundabout is smaller than a predetermined threshold and the exits are not pairwise orthogonal, the processing module 25 will be programmed to generate an accompaniment voice guidance instruction during the maneuver either by repeating an instruction already transmitted during the phase of description of the maneuver, or using a new distinctive or notable place or an element of road infrastructure that was not previously visible. The distinctive or notable place or the element of road infrastructure used must of course be visible, unique and immediately identifiable by the driver.

This instruction will possibly be formulated thus: "now exit the roundabout, just before the hotel X".

If the processing module 25 detects that the driver has gone all the way around the roundabout, it may be programmed to generate an accompaniment voice guidance instruction repeating the voice guidance instruction transmitted during the description phase.

If the voice guidance instruction transmitted during the description phase did not refer to any visual indicator because no indicator was then clearly visible and the speed of the vehicle has dropped greatly (either due to driver hesitation or because of a traffic jam), the processing module 25 is programmed to generate an accompaniment voice guidance instruction using a distinctive or notable place or an element of road infrastructure that has become visible.

The drop must here be greater than a predetermined threshold.

Reassurance Phase

Once the maneuver has been carried out, the processing module 25 evaluates, depending on the complexity of the maneuver and any driver hesitations, the need to give the driver peace of mind regarding the quality of the maneuver that he has just carried out.

To do this, if the processing module 25 detects a hesitation during the maneuver or on exiting the maneuver, it is programmed to generate a reinforcement voice guidance instruction. The decision to generate this instruction may also depend on other factors such as the complexity of the maneuver carried out, the immediate presence of another maneuver to be carried out, etc.

This instruction is preferably reinforced with a visual cue located close to the end of the maneuver or visible only when the maneuver has been completed, this cue preferably being distinct from the visual cues used hitherto.

Continuity Phase

When no maneuvers are required for a distance or time greater than a threshold (for example more than one minute or more than one kilometer), it is preferable for the processing module 25 to indicate to the driver that it is still active.

The voice guidance instruction may then be formulated differently depending on the configuration of the highway taken and depending on the environment visible to the driver.

Consider the case where at least one intersection is detected between the position of the vehicle and the next maneuver to be carried out, where no change of road is planned, and where no change of lane is possible. In this situation, the processing module 25 is programmed to generate a voice guidance instruction that depends on the curvature of the road.

Thus, if the radius of curvature of the road is larger than a predetermined threshold, the voice guidance instruction is formed by placing one after another at least one action, one geographical indicator, one egocentric attribute, one objective and one geographical indicator. It may be expressed in the form "continue straight through the intersections . . . ".

On the contrary, if the radius of curvature of the road is smaller than this threshold, the voice guidance instruction is formed by placing one after another at least one action, one geographical indicator, one egocentric attribute, one objective, one geographical indicator and another egocentric attribute. It may be expressed in the form "follow the main road through the next intersections . . . ".

Consider also the case where at least one intersection is detected between the position of the vehicle and the next maneuver to be carried out, where no change of road is planned, and where no change of lane is desirable on account of the next maneuver to be carried out. In this situation, the processing module 25 is again programmed to generate a voice guidance instruction that depends on the curvature of the road.

Thus, if the radius of curvature of the road is larger than a predetermined threshold, the voice guidance instruction is formed by placing one after another at least one action, one geographical indicator, one egocentric attribute, one objective, one geographical indicator, concatenated with another action, a familiarity criterion, another geographical indicator, and another egocentric attribute. It may be expressed in the form "continue straight through the intersections staying in your lane . . . ".

In contrast, if the radius of curvature of the road is smaller than this threshold, the voice guidance instruction is formed by placing one after another at least one action, one geographical indicator, one attribute, one objective, one geographical indicator, concatenated with another action, a familiarity criterion, another geographical indicator, and another egocentric attribute. It may be expressed in the form "follow the main road through the next intersections and stay in your lane".

Lastly consider also the case where only one intersection is detected between the position of the vehicle and the next maneuver to be carried out, where no change of road is planned, but where a change of lane is required on account of the next maneuver to be carried out. In this situation, the processing module 25 is again programmed to generate a voice guidance instruction that depends on the curvature of the road.

Thus, if the radius of curvature of the road is larger than a predetermined threshold, the voice guidance instruction is formed by placing one after another at least one action, one geographical indicator, one attribute, one objective, one geographical indicator, concatenated with another action, a familiarity criterion, and a target. It may be expressed in the form "continue straight at the intersection then position yourself in the X lane".

On the contrary, if the radius of curvature of the road is smaller than this threshold, the voice guidance instruction is formed by placing one after another at least one action, one geographical indicator, one attribute, one objective, one geographical indicator, concatenated with another action, a familiarity criterion, and a target. It may be expressed in the form "follow the main road at the next intersection and then move to the X lane".

When the distance between the position of the vehicle and the next maneuver to be carried out (or the time required to reach the zone of the maneuver) is greater than a predetermined threshold (for example 2 km), the processing module 25 is programmed to integrate a notion of distance into the voice guidance instruction. This may be expressed in the form "continue straight for x km . . . ".

In the phase called the continuity phase, the voice guidance instructions may also mention an element of road infrastructure (roundabout, bridge, tunnel, crossroads) or a distinctive or notable place (station, petrol station, neon sign) that will be visible (and unique) when approaching the maneuver to be performed. Here again, two cases may be considered.

If the radius of curvature of the road is larger than a predetermined threshold, the voice guidance instruction may be expressed in the form "continue straight until the petrol station".

On the contrary, if the radius of curvature of the road is smaller than this threshold, the voice guidance instruction may be expressed in the form "follow the main road to the next bridge".

If the same maneuver may be performed in a plurality of places, the voice guidance instruction may be expressed in the form: "continue straight until the next instruction" or "continue straight to the end of the street" or "continue straight to the tall building . . . ".

The invention claimed is:

1. A method for generating voice guidance instructions intended for an individual of a vehicle, the method comprising:
  determining, via a computer, a route to be taken by the vehicle;
  acquiring, via a camera located at the vehicle, at least one image of an environment of the individual;
  processing, via the computer, said image to detect therein at least one object and to characterize said object;
  generating, via the computer, and transmitting a voice guidance instruction informing the individual how to perform a maneuver of the vehicle in order to follow said route; and
  determining, via the computer, a level of complexity of said maneuver of the vehicle, wherein
  the generating includes formulating said voice guidance instruction using a cue deduced from the characterization of said object only when the level of complexity of said maneuver of the vehicle is higher than a first threshold, such that the voice guidance instruction, which includes the cue, is output via a speaker associated with the vehicle, and
  when the level of complexity of said maneuver of the vehicle is higher than a second threshold, which is strictly higher than the first threshold, the generating includes formulating said voice guidance instruction using the cue deduced from the characterization of said object as well as an additional cue that provides additional details associated with said maneuver of the vehicle, such that the voice guidance instruction, which includes both the cue and the additional cue, is output via the speaker associated with the vehicle.

2. The generating method as claimed in claim 1, wherein the level of complexity is computed depending on at least one of the following criteria:
  a position of the vehicle with respect to a zone in which said maneuver must be performed,
  a type of road infrastructure present in the zone in which said maneuver must be performed,
  a tension felt by the individual,
  a density of road traffic,
  a number of objects detected in at least one portion of the acquired image,
  the individual's knowledge of the road infrastructure,
  a phase in which the vehicle is currently,
  and, when the road infrastructure is a roundabout, also depending on at least one of the following criteria:
    an angle between an axis of arrival of the individual at the roundabout and an axis of exit of the individual from the roundabout,
    the angle between at least two roads leading to the roundabout,
    a number of roads leading to the roundabout,
    a difference between a number of entrances to the roundabout and a number of exits from the roundabout,
    a number of lanes present in the roundabout, and
    an outside diameter of the roundabout.

3. The generating method as claimed in claim 1, wherein, said cue being a visual cue visible to the individual, when, between a moment at which the voice guidance instruction was transmitted vocally and a moment when the maneuver must be performed, the visual cue disappears from the environment visible to the individual, provision is made for generating a new voice guidance instruction not using said visual cue.

4. The generating method as claimed in claim 1, wherein, said cue being a visual cue visible to the individual, when, between a moment at which the voice guidance instruction was transmitted vocally and a moment when the maneuver must be performed, another visual cue that is indistinguishable from the visual cue used in the voice guidance instruction appears in the environment visible to the individual, provision is made for generating a new voice guidance instruction different from the voice guidance instruction that was transmitted vocally.

5. The generating method as claimed in claim 1, wherein provision is made to determine a cost relating to an additional time or distance that an error in following said route would cause, and wherein the level of complexity is determined depending on said cost.

6. The generating method as claimed in claim 1, wherein provision is made to distinguish between at least two distinct and successive phases prior to the performance of said maneuver, namely a maneuver-anticipation phase, in which a voice guidance instruction configured to be transmitted to indicate to the individual how to position himself to approach the maneuver, and a description phase, in which a voice guidance instruction is transmitted to indicate to the individual how to perform the maneuver, and wherein the voice guidance instructions transmitted in these phases use distinct cues, provision further being made for at least one other phase which follows the description phase and in which a voice guidance instruction may be generated, said other phase being:
  an accompaniment phase simultaneous to said maneuver, or
  a reassurance phase subsequent to said maneuver and allowing it to be indicated to the individual whether he has performed the maneuver correctly, or
  a continuity phase allowing the individual to be informed of an active character of said generating method.

7. The generating method as claimed in claim 6, wherein, when the voice guidance instruction transmitted during the description phase did not refer to any visual indicator and the vehicle slows down, provision is made in the accompaniment phase to transmit a voice guidance instruction using a cue.

8. The generating method as claimed in claim 6, wherein, in the reassurance phase, provision is made to transmit a voice guidance instruction using a visual indicator distinct from the cues used in the one or more voice guidance instructions transmitted during preceding phases.

9. The generating method as claimed in claim 6, wherein, in the continuity phase, provision is made to generate a different voice guidance instruction depending on whether a radius of curvature of a road taken is lower or higher than a threshold.

10. The generating method as claimed in claim 1, wherein, the determining the route to be taken comprises retrieving, from a map database, static visual indicators located on said route and attributes associated with said static visual indicators, provision is made to determine an attribute common to a plurality of static visual indicators, the voice guidance instruction being formulated in the generating using a cue comprising the common attribute when the object is characterized as comprising the common attribute in the processing said image.

11. The generating method as claimed in claim 10, wherein, the static visual indicators being road signs, the common attribute comprises a name that is written on a road sign or a background color of a road sign, the object being a road sign.

12. The generating method as claimed in claim 10, wherein
the processing said image comprises detecting a plurality of objects, and
the generating method further comprises classifying the detected objects, an object characterized as having the common attribute being prioritized, the object selected for the generating being the prioritized object.

13. A device for generating route guidance instructions that are tailored to an environment of a vehicle, the device comprising:
a camera configured to acquire images of the environment;
a map database;
a navigation and geolocation system;
processing circuitry configured to receive and combine elements originating from the camera, from the map database and from the navigation and geolocation system; and
a voice transmitter configured to transmit an indication to an individual, wherein
the processing circuitry is configured to
determine a route to be taken by the vehicle,
receive, from the camera, at least one image of an environment of the individual,
process the image to detect therein at least one object and to characterize the object,
generate a voice guidance instruction informing the individual how to perform a maneuver of the vehicle in order to follow the route, and
determine a level of complexity of the maneuver of the vehicle,
the processing circuitry is configured to generate by formulating the voice guidance instruction using a cue deduced from the characterization of the object only when the level of complexity of the maneuver of the vehicle is higher than a first threshold, such that the voice guidance instruction, which includes the cue, is output via the voice transmitter, and
when the level of complexity of the maneuver of the vehicle is higher than a second threshold, which is strictly higher than the first threshold, the processing circuitry is configured to generate by formulating the voice guidance instruction using the cue deduced from the characterization of the object as well as an additional cue that provides additional details associated with the maneuver of the vehicle, such that the voice guidance instruction, which includes both the cue and the additional cue, is output via the voice transmitter.

14. The generating method as claimed in claim 1, wherein the level of complexity is computed depending on:
a position of the vehicle with respect to a zone in which said maneuver must be performed,
a type of road infrastructure present in the zone in which said maneuver must be performed,
a tension felt by the individual,
a density of road traffic,
a number of objects detected in at least one portion of the acquired image,
the individual's knowledge of the road infrastructure,
a phase in which the vehicle is currently, and
when the road infrastructure is a roundabout, also depending on at least one of the following criteria:
an angle between an axis of arrival of the individual at the roundabout and an axis of exit of the individual from the roundabout,
an angle between at least two roads leading to the roundabout,
a number of roads leading to the roundabout,
a difference between the number of entrances to the roundabout and the number of exits from the roundabout,
a number of lanes present in the roundabout, and
an outside diameter of the roundabout.

15. The generating method as claimed in claim 1, wherein
the processing said image comprises detecting a plurality of objects, and
the generating method further comprises classifying the detected objects using a trained artificial intelligence and performing a statistical computation to assign a weight to each of the detected objects.

* * * * *